(12) United States Patent
Blakley et al.

(10) Patent No.: US 7,502,468 B2
(45) Date of Patent: Mar. 10, 2009

(54) METHOD AND SYSTEM FOR GENERATING A CRYPTOGRAPHICALLY RANDOM NUMBER STREAM

(75) Inventors: George Robert Blakley, Austin, TX (US); Randall Findley, Austin, TX (US); Richard Goble, Cedar Creek, TX (US); Scott Herrington, Cedar Park, TX (US); Kyle Stein, Round Rock, TX (US)

(73) Assignee: nCipher Corporation Ltd., Stoneham, MA (US)

(*) Notice: Subject to any disclaimer, the term of this patent is extended or adjusted under 35 U.S.C. 154(b) by 922 days.

(21) Appl. No.: 10/932,928

(22) Filed: Sep. 2, 2004

(65) Prior Publication Data

US 2005/0110399 A1 May 26, 2005

Related U.S. Application Data

(60) Provisional application No. 60/499,567, filed on Sep. 2, 2003.

(51) Int. Cl.
*H04L 9/00* (2006.01)

(52) U.S. Cl. .................. 380/46; 380/262; 380/264; 380/265; 380/268

(58) Field of Classification Search .................. 380/46, 380/262, 264, 265, 268
See application file for complete search history.

(56) References Cited

U.S. PATENT DOCUMENTS

| | | | | |
|---|---|---|---|---|
| 4,573,024 A | * | 2/1986 | Carlqvist | 331/1 A |
| 4,905,176 A | * | 2/1990 | Schulz | 708/252 |
| 5,404,402 A | * | 4/1995 | Sprunk | 713/189 |
| 5,493,612 A | * | 2/1996 | Klund et al. | 380/253 |
| 5,566,099 A | * | 10/1996 | Shimada | 708/250 |
| 5,570,307 A | * | 10/1996 | Takahashi | 708/256 |
| 5,706,218 A | | 1/1998 | Hoffman | |
| 5,781,458 A | * | 7/1998 | Gilley | 708/255 |
| 5,961,577 A | | 10/1999 | Soenen et al. | |

(Continued)

OTHER PUBLICATIONS

Wagner, David, Random.org—True Random Number Service, last accessed Jul. 26, 2004, 2 pages, http://www.random.org/.

(Continued)

*Primary Examiner*—Carl Colin
(74) *Attorney, Agent, or Firm*—John A. Fortkort; Fortkort & Houston P.C.

(57) ABSTRACT

A method and system for generating a cryptographically random number stream (100) is provided. A system includes a module (102) configured to provide at least two statistically random number streams (106) and (108) and an oscillator (104) operably coupled to the module (102). The oscillator (104) is configured to operate at a frequency which varies in response to physically unpredictable events and to select a current number from one of the at least two statistically random number streams (106) and (108) based on the oscillator's state. A process includes several steps. At least two statistically random number streams are provided (138). A current number is selected (140) from one of the at least two statistically random number streams based on the state of an oscillator operating at a frequency which varies in response to physically unpredictable events. The step of selecting (140) is repeated (142) to create the cryptographically random number stream. The number streams can be carried by signals (132), (134), and (136). An apparatus for performing the process is also disclosed.

52 Claims, 5 Drawing Sheets

U.S. PATENT DOCUMENTS

| | | | |
|---|---|---|---|
| 5,963,104 A | 10/1999 | Buer | |
| 5,966,313 A * | 10/1999 | Sakamoto | 708/250 |
| 6,061,702 A | 5/2000 | Hoffman | |
| 6,067,359 A * | 5/2000 | Shimada | 380/46 |
| 6,215,874 B1 | 4/2001 | Borza et al. | |
| 6,263,082 B1 * | 7/2001 | Ishimoto et al. | 380/46 |
| 6,480,072 B1 | 11/2002 | Walsh et al. | |
| 6,542,014 B1 | 4/2003 | Saito | |
| 6,571,263 B1 | 5/2003 | Nagai | |
| 6,587,562 B1 * | 7/2003 | Jansen et al. | 380/262 |
| 6,754,345 B2 * | 6/2004 | Ishimoto et al. | 380/46 |
| 6,826,494 B2 * | 11/2004 | Yamane et al. | 702/69 |
| 6,862,605 B2 * | 3/2005 | Wilber | 708/255 |
| 7,117,233 B2 * | 10/2006 | Dichtl | 708/250 |
| 7,139,397 B2 * | 11/2006 | Messina et al. | 380/46 |
| 7,236,594 B2 * | 6/2007 | Van Veldhoven et al. | 380/46 |
| 7,308,104 B1 * | 12/2007 | Kim et al. | 380/268 |
| 2001/0033663 A1 * | 10/2001 | Ishimoto et al. | 380/265 |
| 2003/0005321 A1 * | 1/2003 | Fujioka | 713/193 |
| 2004/0006580 A1 | 1/2004 | Miller, Jr. | |
| 2004/0096060 A1 * | 5/2004 | Henry et al. | 380/46 |
| 2004/0208322 A1 * | 10/2004 | Ozluturk | 380/268 |

OTHER PUBLICATIONS

Wagner, David, random.org—introduction to randomness and random numbers last accessed Jul. 26, 2004, 4 pages, http://www.random.org/essay.html.

Wagner, David, Randomness for crypto, last accessed Jul. 26, 2004, 3 pages, http://www.cs.berkeley.edu/~daw/rnd/.

Wagner, David, Randomness for crypto (Sourcecode), last accessed Jul. 26, 2004, 4 pages, view-source:http://www.cs.berkeley.edu/~daw/rnd/.

* cited by examiner

METHOD AND SYSTEM FOR GENERATING A CRYPTOGRAPHICALLY RANDOM NUMBER STREAM

CROSS-REFERENCE TO RELATED PATENT APPLICATIONS

This patent application claims the benefit of U.S. Provisional Patent Application No. 60/499,567, entitled, "Method and Apparatus for Random Number Generation," and filed Sep. 2, 2003.

TECHNICAL FIELD OF THE DISCLOSURE

This disclosure pertains to the generation of random numbers. More particularly, this disclosure pertains to a method and system for generating a cryptographically random number stream.

BACKGROUND OF THE DISCLOSURE

Many people and organizations have come to rely heavily on electronic data. Consequently, many such people and organizations, as well as those they serve, have come to attach great importance to the information security of their electronic data. Many information security systems require that one or more cryptographically random number streams be provided for generating keys and other purposes. A stream of numbers is cryptographically random if at any point in the stream the history of prior numbers provides negligible assistance in predicting any subsequent number of the stream.

While cryptographically random number streams of numbers are conceptually simple, it has proved very difficult to generate such streams in an industrially useful fashion. For example, a stream of coin flips is cryptographically random, but coin flipping cannot be used to provide industrially useful number streams.

To get around the difficulty of generating cryptographically random number streams, one prior art approach involves providing a cryptographically random number as a seed to a pseudo random number stream. Such a seed can be obtained in many ways, a common one of which is sampling noise from a complex process that is very difficult to accurately model: for example, the thermal noise across a semiconductor diode or resistor. However, pseudo random number streams are algorithmic and thus predictable if the algorithm and seed are known. The effectiveness of this approach to information security is limited by its reliance upon such streams.

What is needed to provide greater security of electronic data is an industrially useful method and system for generating cryptographically random number streams. This disclosure provides such a method and system. These and other advantages, as well as additional inventive features, will be apparent from the present disclosure.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

DETAILED DESCRIPTION

Other aspects, objectives and advantages of the invention will become more apparent from the remainder of the detailed description when taken in conjunction with the accompanying drawings.

Figure 1:
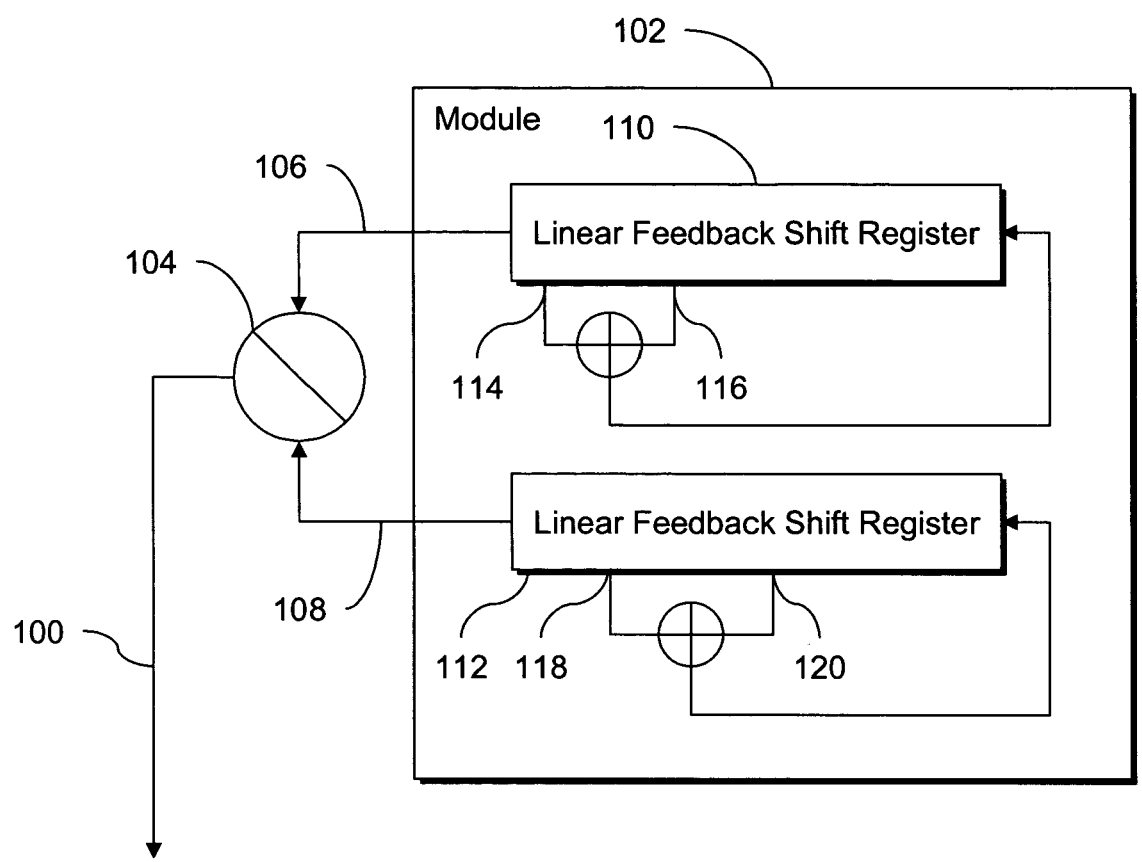
FIG. 1 shows a block diagram of a system for creating a cryptographically random number stream, according to an embodiment of the present invention.

FIG. 1 shows a block diagram of a system for creating a cryptographically random number stream 100, according to an embodiment of the present invention. The system includes a module 102 and an oscillator 104. The module 102 is configured to provide two statistically random number streams 106 and 108. The oscillator 104 is operably coupled to the module 102 and configured to operate at a frequency varying in response to physically unpredictable events. The oscillator 104 is also configured to select a current number from one of the two statistically random number streams 106 and 108 based on the oscillator's 104 state. From the above system characteristics, it naturally follows that operation of the system creates the cryptographically random number stream 100.

Figure 2:
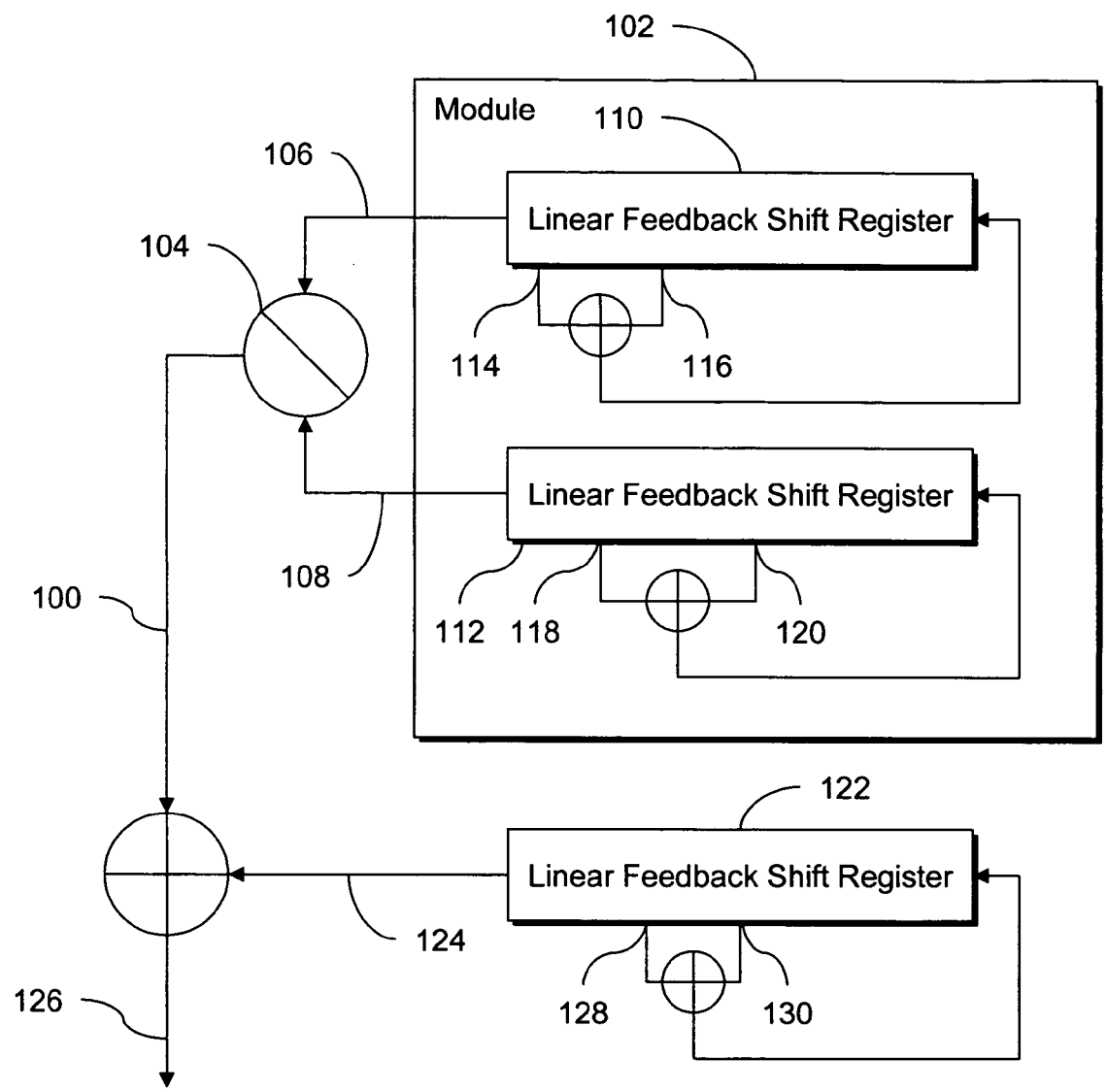
FIG. 2 shows a block diagram of another system for creating a cryptographically random number stream, according to an embodiment of the present invention.

As shown, the module includes two linear feedback shift registers 110 and 112 having different taps 114-120. Each register 110 and 112 outputs one of the two statistically random number streams 106 and 108. FIG. 2 shows an augmented system including a third linear feedback shift register 122 which also outputs a statistically random number stream 124 which is XORed with the output 100 of the above-referenced oscillator 104 in order to output another cryptographically random number stream 126. The oscillator 104 may, in fact, include multiple oscillators operably configured to operate in coordination.

Preferably, the linear feedback shift registers 110, 112, and 122 are frequency-aligned; even more preferably, the linear feedback shift registers 110, 112, and 122 are 1:1 frequency-aligned and therefore operate on a single clock and respectively output bits 106, 108, and 124 in the same clock cycle. Within the same clock cycle, the oscillator 104 selects between the output bits 106 and 108, outputting a bit 100 identical to the selected bit. Consequently, the bit stream 100 is cryptographically random and can be output at a rate of one bit per clock cycle. Preferably also within the same clock cycle, the output of linear feedback shift register 122 is XORed with the output 100 of the oscillator 104, producing output bit 126. Consequently, the bit stream 126 is also cryptographically random.

The described system can optionally be employed in a fashion such that one or more of the cryptographically random number streams are utilized at a rate below 100%. A portion of the numbers or bits output will be "wasted" or "dropped on the floor" rather than being used as part of a final output stream. Accordingly, such a final output number stream will present an incomplete history of the earlier output stream generated by the system. As an example, this variation can be implemented to provide an historically incomplete final output stream for TCP and SSL encryption.

Returning to FIG. 1, to prevent always-zero output, each linear feedback shift register 110 and 112 preferably has a non-zero initial fill. Also, in order for the two linear feedback shift registers 110 and 112 to produce different statistically random number streams 106 and 108, each should have a different initial fill and/or different taps. However, the initial fills need not be random. As those skilled in the art will appreciate, initial fills may be taken from a number of sources. In a hardware implementation, for instance, an initial fill can come from read-only memory. In a software implementation, by contrast, an initial fill can come from the system clock.

fills of 10111 and 11100, respectively. The two 5-bit linear feedback shift registers output bits into an oscillator which operates at a frequency which varies in response to physically unpredictable events. The oscillator selects between the two output bits based on its state during a given clock cycle and outputs that bit as an input of an XOR operator.

The simple embodiment also includes a third linear feedback shift register which is 7 bits wide with taps at bits 0 and 2 and an initial fill of 0110101. The third linear feedback shift register's output provides the other input bit to the XOR operator. The output of the XOR operator is then the output of the simple embodiment.

The following table shows the operational values for components of the simple embodiment for 24 clock cycles:

TABLE FOR EXAMPLE 1

| Cycle | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| LFSR 1 | 1 | 1 | 1 | 0 | 1 | 0 | 0 | 1 | 1 | 1 | 0 | 1 | 0 | 0 | 1 | 1 | 1 | 0 | 1 | 0 | 0 | 1 | 1 | 1 |
| LFSR 2 | 0 | 0 | 1 | 1 | 1 | 0 | 1 | 0 | 1 | 0 | 0 | 1 | 1 | 0 | 0 | 1 | 1 | 1 | 1 | 0 | 0 | 0 | 0 | 1 |
| Osc State | H | H | H | H | L | L | L | L | L | H | H | H | L | L | L | L | H | H | H | H | H | L | L | L |
| Osc Output | 1 | 1 | 1 | 0 | 1 | 0 | 1 | 0 | 0 | 1 | 0 | 1 | 0 | 1 | 0 | 0 | 1 | 0 | 1 | 0 | 0 | 0 | 0 | 1 |
| LFSR 3 | 1 | 0 | 1 | 0 | 1 | 1 | 0 | 0 | 0 | 0 | 1 | 1 | 1 | 0 | 0 | 1 | 1 | 0 | 1 | 1 | 1 | 1 | 1 | 0 |
| XOR Output | 0 | 1 | 0 | 0 | 0 | 1 | 1 | 0 | 0 | 1 | 1 | 0 | 1 | 1 | 0 | 1 | 0 | 0 | 0 | 1 | 1 | 1 | 1 | 1 |

The average frequency of the oscillator 104 is preferably different from the clock frequency governing the linear feedback shift registers 110 and 112. Still more preferably, the frequency of the oscillator 104 is less than ½ of the clock frequency governing the linear feedback shift registers 110 and 112. Even more preferably, the frequency of the oscillator 104 is within the range of 1/64 and ½ of the clock frequency governing the linear feedback shift registers 110 and 112.

The timing and pattern of selecting a current number from one of the statistically random number streams 106 and 108 can affect the cryptographically random number stream 100 resulting. Hence, also within the scope of the claimed invention, as will be understood by those having skill in the art, occurrence of selections from the oscillator 104 may be periodic with fixed or varying period, such period may or may not be in frequency alignment with the statistically random number streams 106 and 108, or may be aperiodic.

Returning to FIG. 2, preferably, the linear feedback shift register 122 is 521 bits wide with taps 128 and 130 at bits 0 and 32 and has a characteristic polynomial of $x^{32}+x+1$, which is irreducible over $GF(2^{521})$. It is also preferred that the linear feedback shift registers 110 and 112 be 127 bits wide with taps 114-120 at 0 and 1 and have characteristic polynomials of $x^2+x+1$, which is irreducible over $GF(2^{127})$.

In other embodiments, the linear feedback shift registers 110, 112, and 122 may have different width; number and placement of taps 114-120, 128 and 130; and characteristic polynomial. Furthermore, the widths, number and placement of taps 114-120, and characteristic polynomials of the two module linear feedback shift registers 110 and 112 need not be identical.

EXAMPLE 1

For illustration purposes, a simple embodiment of the present disclosure is now described. In more preferred embodiments, the linear feedback shift registers would be wider and would have irreducible characteristic polynomials.

The simple embodiment includes two linear feedback shift registers which are 5 bits wide with taps at 0 and 1 and initial Generally, linear feedback shift registers can be implemented in software or hardware. Although a software model of the oscillator, by definition causes it to lose its desired physical unpredictability, there are methods accepted in the art as suitable though not ideal practices for modeling the properties the oscillator requires. Such accepted practices include using the entropy created by the keyboard, mouse, interrupts and disk drive behavior in a variety of operating systems. Consequently, the present disclosure provides for embodiments of the present invention implemented in software, hardware, or a combination of the two. Field programmable gate arrays are a potential means of implementing the present invention as a combination of hardware and software.

Figure 3:
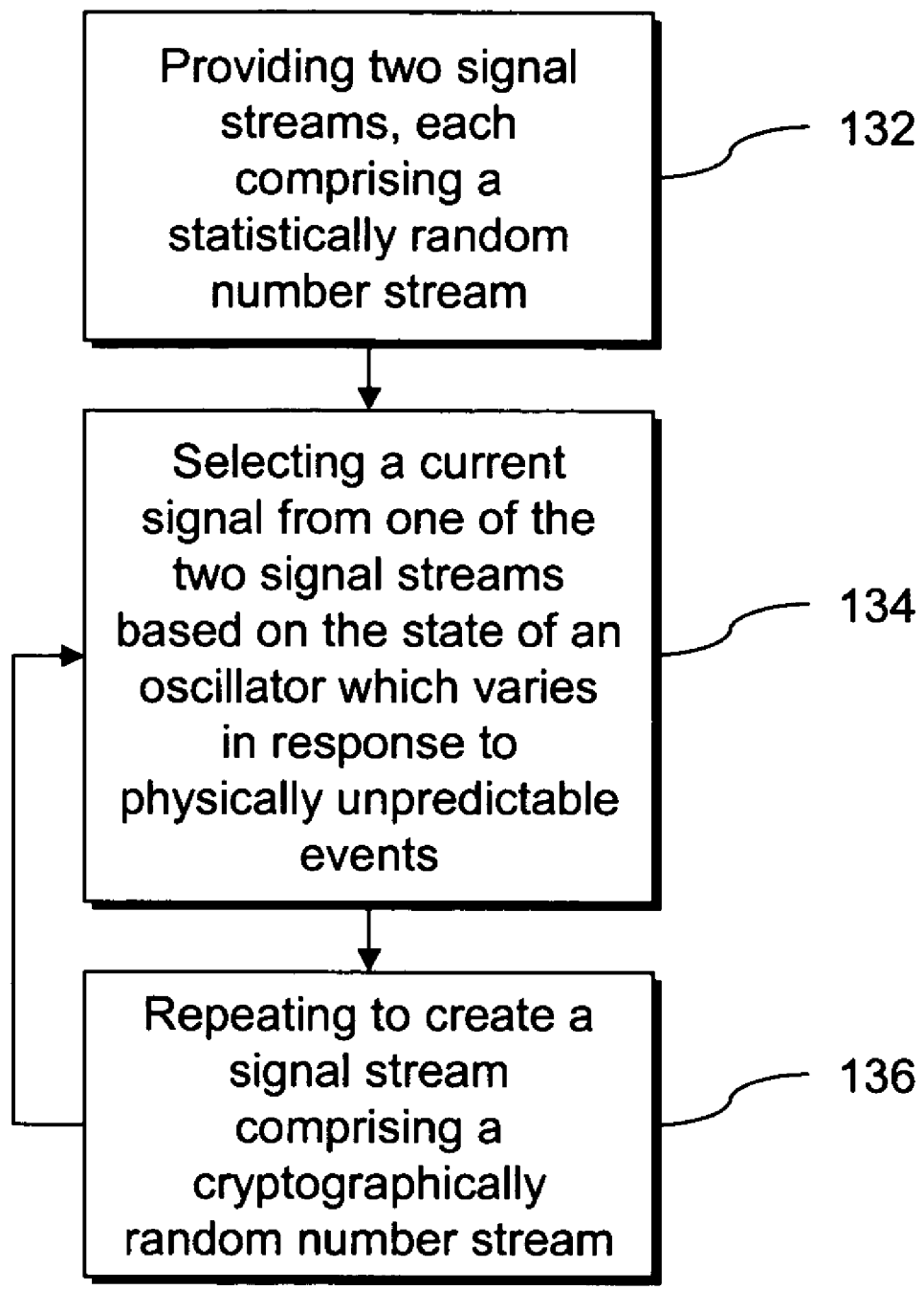
FIG. 3 shows a flow-diagram of a method for creating a signal stream comprising a cryptographically random number stream, according to an embodiment of the present invention.

FIG. 3 shows a flow-diagram of a method for creating a signal stream comprising a cryptographically random number stream, according to an embodiment of the present invention. The method includes several steps. Two signal streams are provided 132. Each signal stream includes a statistically random number stream. Each signal of each signal stream includes a number of the corresponding statistically random number stream. A current signal is selected 134 from one of the two signal streams based on the state of an oscillator operating at a frequency varying in response to physically unpredictable events. The current signal corresponds to a current number of the statistically random number stream corresponding to the one signal stream. Repetition 136 of the step of selecting 134 creates a signal stream comprising the cryptographically random number stream.

Figure 4:
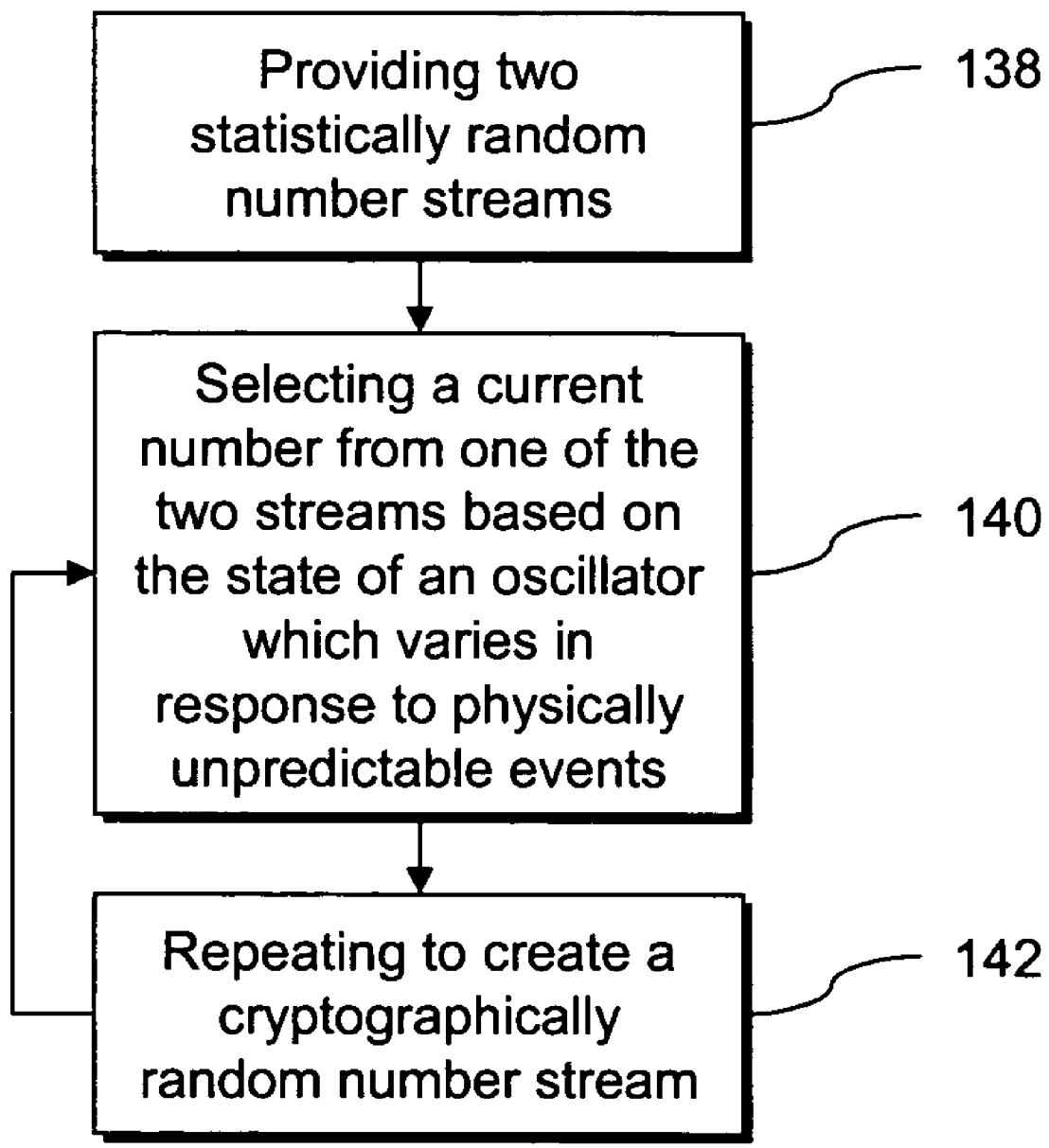
FIG. 4 shows a flow-diagram of a process for creating a cryptographically random number stream, according to an embodiment of the present invention.

FIG. 4 shows a flow-diagram of a method for creating a cryptographically random number stream, according to an embodiment of the present invention. The method includes several steps. Two statistically random number streams are provided 138. A current number is selected 140 from one of the two statistically random number streams based on the state of an oscillator operating at a frequency which varies in response to physically unpredictable events. The selection step 140 is repeated 142 to create the cryptographically random number stream. The frequency of the selection step repetition 142 may be varied or fixed, and may be in frequency alignment with one or both of the statistically random number streams. In addition, this disclosure provides an apparatus for carrying out the above steps.

Figure 5:
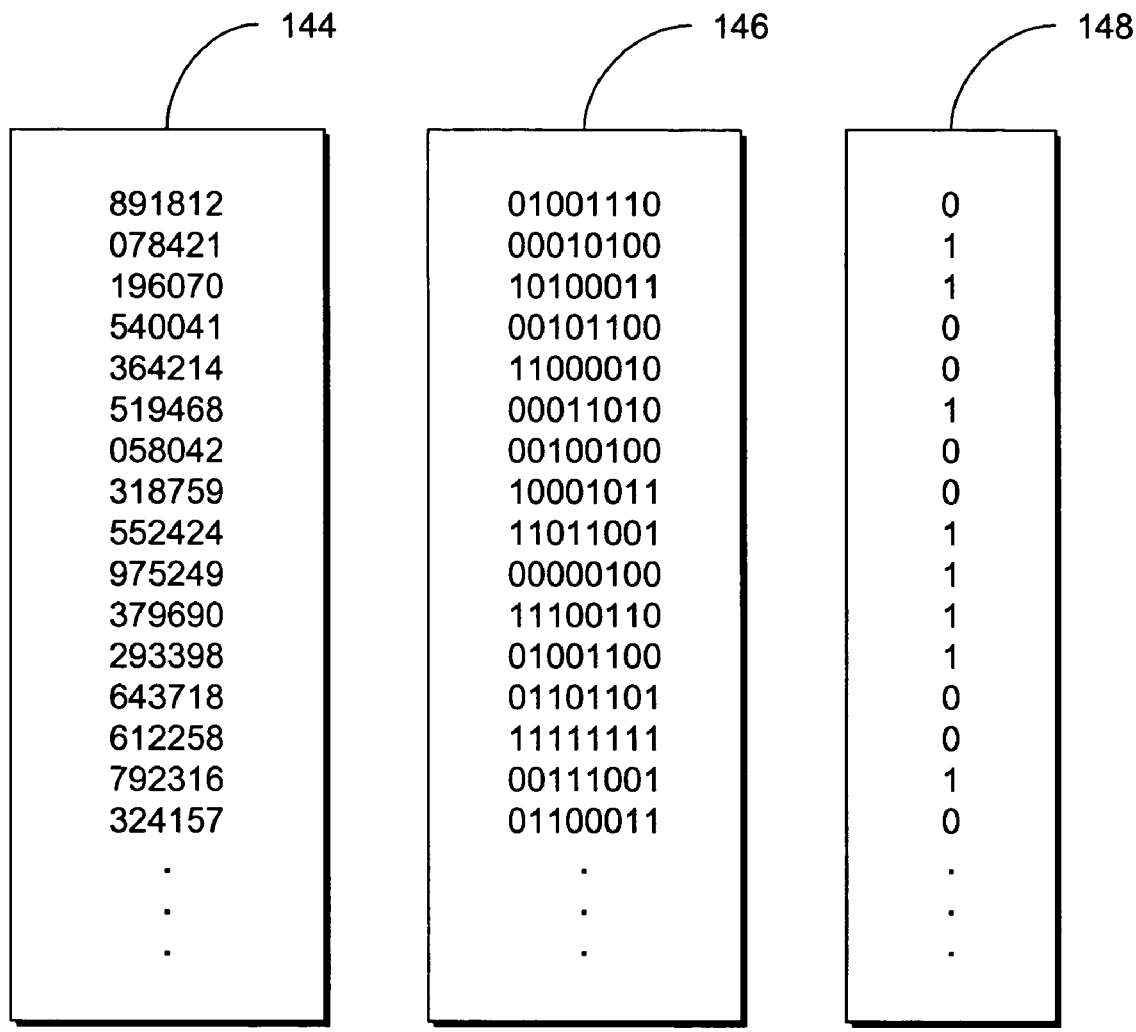
FIG. 5 shows outputs of three cryptographically random number streams—one of base-ten numbers within the range 0 to 99,999, one of base-two numbers within the range 0 to 255, and one of bits—according to an embodiment of the present invention.

FIG. 5 shows outputs of three cryptographically random number streams—one stream 144 of base-ten numbers within the range 0 to 99,999, one stream 146 of base-two numbers within the range 0 to 255, and one stream 148 of bits—according to an embodiment of the present invention. As will be clear to those skilled in the art, the streams 144, 146, and 148 are depicted for illustrative purposes only because the depicted number streams' cryptographically random nature is negated by virtue of being depicted.

A brief description of contextual terminology follows:

The term "frequency-aligned," as used herein, means that the ratio between the frequencies can be expressed as a ratio of integers. Some examples of ratios between the periods of frequency-aligned streams include e.g. 1:1, 1:2, 2:1, 2:3, 3:2, 1:3, 3:1, etc.

The term "linear feedback shift register," as used herein, means any of a well-known class of devices for outputting a bit stream. A linear feedback shift register includes a register which contains a bit pattern called a fill. In each clock cycle, a linear feedback shift register performs the following four steps:

1. Output the least significant bit in the register.
2. Calculate a feedback bit as a linear function of two or more fixed bit positions in the register.
3. Shift the fill in the register one bit toward lesser significance. Discard the bit output in Step 1.
4. Replace the most significant bit in the register with the feedback bit calculated in Step 2.

The fixed bit positions of Step 2 are the taps of the linear feedback shift register. While any linear function will be sufficient, a commonly used linear function of Step 2 is to XOR the bits at the taps. In general, a linear feedback shift register with a w-bit register and taps corresponding to an irreducible polynomial in the Galois Field $GF(2^w)$ produces an output stream which is statistically random and does not repeat until the entire Galois Field has been exhausted.

The term "oscillator," as used herein, means a device which varies between at least two states at a frequency which varies based on physically unpredictable events. For example, such an oscillator could be highly sensitive to minute changes in temperature or voltage. Such an oscillator will vary between its at least two states erratically, providing physical unpredictability which forms a basis for cryptographic randomness. An example of such an oscillator is any common silicon oscillator which operates in free-running unlocked or unreferenced mode.

The term "physically unpredictable," as used herein, means physical processes which the current state of the art is incapable of accurately predictively modeling. Some examples of physically unpredictable events include thermal noise created across a semiconductor diode or resistor, the interval between the emission of particles during radioactive decay, and the flipping of a fair coin.

The term "statistically random," as used herein, means the subject stream has uniform statistical properties. For example, if digits in the stream range from 0 to 9, then each digit should appear equally: 10% of the time. In addition, each two-digit set of digits, i.e., 00, 01, 02, etc., should appear equally often: 1% of the time. Similarly, each three-digit set of digits, i.e., 000, 001, 002, etc., should appear equally often: 0.1% of the time. And so forth.

Statistically random number streams can be, but are not necessarily cryptographically random number streams. For example, by definition, a linear feedback shift register outputs a statistically random number stream, but if one knows a set of consecutive numbers output from the register equal to the register's width and also knows the number and location of the register's taps, then one can predict the register's entire output stream.

The term "XOR," as used herein, means the well known function defined by the following truth table:

| A | B | A XOR E |
|---|---|---------|
| 0 | 0 | 0 |
| 0 | 1 | 1 |
| 1 | 0 | 1 |
| 1 | 1 | 0 |

It is well-known that the XOR of a statistically random number stream and an independent cryptographically random number stream is both statistically and cryptographically random.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced within the scope of the claims otherwise than as specifically described herein. For example, the non-module linear feedback shift register can be made different length than the module linear feedback shift registers in order to extend the cycle length of statistically random numbers, which could be helpful if the oscillator becomes stuck in one state. In another example, the module linear feedback shift registers can be of different length. In yet another example, each of the two statistically random number streams providing input to the oscillator outputs more than one number at a time. In a further example, a plurality of non-module linear feedback shift registers are XORed with the output of the oscillator in a cascading configuration. In a still further example, the module, which produces two statistically random number streams, logically includes two otherwise independent sources of the statistically random number streams. In an even further example, the module includes a number of operably configured sources of number streams which ultimately produce at least two statistically random number streams. In yet a still further example, the oscillator which varies between at least three states. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for creating a cryptographically random number stream, comprising:
   a module configured to provide at least two statistically random number streams;
   an oscillator distinct from said module operably coupled to the module, wherein the oscillator is configured to operate at a frequency which varies in response to physically unpredictable events and to select a current number from one of the at least two statistically random number streams based on the oscillator's state;
   whereby the system creates the cryptographically random number stream.

2. The system of claim 1, wherein the at least two statistically random number streams are frequency-aligned with one another.

3. The system of claim 1, wherein the oscillator is further configured to periodically select the current number from one of the at least two statistically random number streams based on the oscillator's state.

4. The system of claim 3, wherein the period of selection by the oscillator varies over time.

5. The system of claim 4, wherein the period of the selection by the oscillator is in frequency alignment with the statistically random number streams.

6. The system of claim 1, wherein the oscillator is further configured to aperiodically select the current number from one of the at least two statistically random number streams based on the oscillator's state.

7. The system of claim 1, wherein the frequencies of the at least two statistically random number streams are identical.

8. The system of claim 1, wherein the frequency of the oscillator averages less than ½ the lesser of the frequencies of the at least two statistically random number streams.

9. The system of claim 8, wherein the frequency of the oscillator averages less than ½ and more than 1/64 the lesser of the frequencies of the at least two statistically random number streams.

10. The system of claim 1, wherein the oscillator operably coupled to the module comprises a plurality of oscillators operating at frequencies which vary in response to physically unpredictable events, wherein the oscillators of the plurality of oscillators are configured to operate collectively as the oscillator operably coupled to the module.

11. The system of claim 1, wherein the each statistically random number stream comprises a statistically random bit steam, whereby the cryptographically random number stream comprises a ayptographically random bit steam.

12. The system of claim 11, further comprising:
   a combiner operably coupled with the oscillator;
   a bit stream component operably coupled to the combiner and configured to provide another statistically random number stream;
   wherein the component is configured to XOR a current number of the another statistically random number stream and a current number of the cryptographically random number stream output by the oscillator.

13. The system of claim 12, wherein the module comprises at least two linear feedback shift registers each having different taps and each producing one of the module's statistically random number streams.

14. The system of claim 1, wherein the at least two statistically random number steams consist of exactly two statistically random number streams.

15. The system of claim 1,
   wherein the module is configured to provide the at least two statistically random number streams at a rate of one number per clock cycle;
   wherein the oscillator is configured to select the current number at a rate of one number per clock cycle; and
   whereby the system creates the cryptographically random number stream at a rate of one number per clock cycle.

16. A method for creating a signal stream comprising a cryptographically random number stream, the method comprising the steps of:
   providing at least two signal streams, wherein each signal stream comprises a statistically random number stream, and wherein each signal of each signal stream comprises a number of the corresponding statistically random number stream;
   selecting a current signal from one of the at least two signal streams based on the state of an oscillator which is distinct from the module and which operates at a frequency which varies in response to physically unpredictable events, wherein the current signal corresponds to a current number of the statistically random number stream corresponding to the one signal stream; and
   repeating the step of selecting to create a signal stream comprising the cryptographically random number stream.

17. The method of claim 16, wherein the step of providing at least two signal streams comprises the step of:
   providing at least two frequency-aligned signal streams, wherein each signal stream comprises a statistically random number stream, and wherein each signal of each signal stream comprises a number of the corresponding statistically random number stream.

18. The method of claim 16, wherein the step of repeating comprises the step of:
   repeating at a fixed frequency the step of selecting to create the signal stream comprising the cryptographically random number stream.

19. The method of claim 16, wherein the step of repeating comprises the step of:
   repeating at a varying frequency the step of selecting to create the signal stream comprising the cryptographically random number stream.

20. The method of claim 16, wherein the step of providing at least two signal streams comprises the step of:
   providing at least two identical-frequency signal streams having, wherein each signal stream comprises a statistically random number stream, and wherein each signal of each signal stream comprises a number of the corresponding statistically random number stream.

21. The method of claim 16, wherein the step of selecting comprises the step of:
   selecting the current signal from one of the at least two signal steams based on the state of the oscillator operating at the frequency which varies in response to physically unpredictable events, the oscillator frequency averaging less than ½ the lesser of the frequencies of the at least two signal steams, wherein the current signal corresponds to the current number of the statistically random number stream corresponding to the one signal stream.

22. The method of claim 21, wherein the step of selecting comprises the step of:
selecting the current signal from one of the at least two signal steams based on the state of the oscillator operating at the frequency which varies in response to physically unpredictable events, the oscillator frequency averaging less than ½ and more than 1/64 the lesser of the frequencies of the at least two signal streams, wherein the current signal corresponds to the current number of the statistically random number steam corresponding to the one signal stream.

23. The method of claim 16, wherein the step of repeating comprises the step of:
repeating, in frequency alignment with the signal stream having the lesser frequency, the step of selecting to create a signal stream comprising the cryptographically random number steam.

24. The method of claim 16, wherein the step of repeating comprises the step of:
repeating aperiodically the step of selecting to create a signal stream comprising the cryptographically random number stream.

25. The method of claim 16, wherein the step of providing at least two signal streams comprises the step of:
providing at least two signal streams, wherein each signal stream comprises a statistically random bit stream, and wherein each signal of each signal stream comprises a bit of the corresponding statistically random bit stream; and
whereby the cryptographically random number stream comprises a cryptographically random bit stream.

26. The method of claim 25, further comprising the step of:
XORing the selected current signal's number with another signal stream's current number, wherein the another signal stream comprises another statistically random bit stream;
wherein the step of repeating comprises the step of repeating the steps of selecting and XORing; and
whereby yet another signal stream is created comprising another cryptographically random bit stream.

27. The method of claim 26, wherein the step of providing comprises the step of:
providing at least two signal streams provided, respectively, by at least two linear feedback shift registers each having different taps, wherein each signal stream comprises a statistically random bit stream, and wherein each signal of each signal stream comprises a hit of the corresponding statistically random bit stream.

28. The method of claim 16, wherein the step of providing consists of the step of:
providing exactly two signal streams, wherein each signal stream comprises a statistically random number stream, and wherein each signal of each signal stream comprises a number of the corresponding statistically random number stream.

29. The method of claim 16,
wherein the step of providing comprises the step of providing at least two signal streams at a rate of one signal per clock cycle, wherein each signal stream comprises a statistically random number stream, and wherein each signal of each signal stream comprises a number of the corresponding statistically random number stream;

selecting, at the rate of one signal per clock cycle, a current signal from one of the at least two signal streams based on the state of an oscillator operating at a frequency which varies in response to physically unpredictable events, wherein the current signal corresponds to a current number of the statistically random number stream corresponding to the one signal stream; and
repeating, at the rate of one signal per clock cycle, the step of selecting to create a signal stream comprising the cryptographically random number stream.

30. A process for creating a cryptographically random number stream, comprising the steps of:
providing at least two statistically random number streams;
selecting a current number from one of the at least two statistically random number streams based on the state of an oscillator which is distinct from the module and which operates at a frequency which varies in response to physically unpredictable events; and
repeating the step of selecting to create the cryptographically random number stream.

31. The process of claim 30, wherein the step of providing comprises the step of:
providing at least two statistically random number streams which are frequency-aligned with one another.

32. The process of claim 30, wherein the step of repeating comprises the step of:
repeating at a fixed frequency the step of selecting to create the cryptographically random number stream.

33. The process of claim 30, wherein the step of repeating comprises the step of:
repeating at a varying frequency the step of selecting to create the cryptographically random number stream.

34. The process of claim 30, wherein the step of providing comprises the step of:
providing at least two statistically random number streams with identical frequencies.

35. The process of claim 30, wherein the step of selecting comprises the step of:
selecting the current number from one of the at least two statistically random number streams based on the stale of the oscillator operating at the frequency which varies in response to physically unpredictable events, wherein the frequency of the oscillator avenges less than ½ the lesser of the frequencies of the at least two statistically random number streams.

36. The process of claim 30, wherein the step of selecting comprises the step of:
selecting the current number from one of the at least two statistically random number streams based on the state of the oscillator operating at the frequency which varies in response to physically unpredictable events, wherein the frequency of the oscillator avenges less than ½ and more than 1/64 the lesser of the frequencies of the at least two statistically random number streams.

37. The process of claim 30, wherein the step of repeating comprises the step of:
repeating, in frequency alignment with the signal steam having the lesser frequency, the step of selecting to create the cryptographically random number stream.

38. The process of claim 30, wherein the step of repeating comprises the step of:
repeating aperiodically the step of selecting to create the cryptographically random number stream.

39. The process of claim 30, wherein the step of providing comprises the step of:
providing at least two statistically random bit streams;

whereby the cryptographically random number stream comprises a cryptographically random bit stream.

40. The process of claim 39, further comprising the step of:
XORing the selected current number with another statistically random bit stream's current number;
wherein the step of repeating comprises the step of repeating the steps of selecting and XORing; and
whereby another cryptographically random bit stream is created.

41. The process of claim 40, wherein the step of providing comprises the step of:
providing at least two statistically random bit streams, respectively, by at least two linear feedback shift registers each having different taps.

42. The process of claim 30,
wherein the step of providing consists of the step of providing exactly two statistically random number streams; and
wherein the step of selecting consists of the step of selecting the current number from one of the exactly two statistically random number streams based on the state of the oscillator operating at a frequency which varies in response to physically unpredictable events.

43. The process of claim 30,
wherein the step of providing comprises the step of providing at least two statistically random number streams at a rate of one number per clock cycle;
wherein the step of selecting comprises the step of selecting, at the rate of one number per clock cycle, a current number from one of the at least two statistically random number steams based on the state of an oscillator operating at a frequency which varies in response to physically unpredictable events; and
whereby the step of repeating comprises the step of repeating the step of selecting to create the cryptographically random number stream at the rate of one number per clock cycle.

44. An apparatus for creating a cryptographically random number stream, comprising:
providing means for providing at least two statistically random number streams;
selecting means for selecting a current number from one of the at least two statistically random number streams based on the state of an oscillator which is distinct from said providing means and which operates at a frequency which varies in response to physically unpredictable events;
and whereby repeated operation of the apparatus creates a cryptographically random number stream.

45. The apparatus of claim 44, wherein the means for providing comprises:
means for providing at least two statistically random number streams which are frequency-aligned with one another.

46. The apparatus of claim 44, wherein the means for providing comprises:
means for providing at least two statistically random number streams with identical frequencies.

47. The apparatus of claim 44, wherein the means for selecting comprises:
means for selecting the current number from one of the at least two statistically random number steams based on the state of the oscillator operating at the frequency which varies in response to physically unpredictable events, wherein the frequency of the oscillator averages less than ½ the lesser of the frequencies of the at least two statistically random number streams.

48. The apparatus of claim 44, wherein the means for selecting comprises:
means for selecting the current number from one of the at least two statistically random number streams based on the state of the oscillator operating at the frequency which varies in response to physically unpredictable events, wherein the frequency of the oscillator averages less than ½ and more than 1/64 the lesser of the frequencies of the at least two statistically random number streams.

49. The apparatus of claim 44, wherein the means for providing comprises:
means for providing at least two statistically random bit streams;
whereby the cryptographically random number stream comprises a cryptographically random bit stream.

50. The apparatus of claim 49, further comprising:
means for XORing the selected current number with another statistically random bit stream's current number;
whereby repeated operation of the apparatus creates another cryptographically random bit stream.

51. The apparatus of claim 44,
wherein the means for providing consists of a means for providing exactly two statistically random number streams; and
wherein the means for selecting consists of a means for selecting a current number from one of the exactly two statistically random number streams based on the state of an oscillator operating at a frequency which varies in response to physically unpredictable events.

52. The apparatus of claim 44,
wherein the means for providing comprises a means for providing at least two statistically random number streams at a rate of one number per clock cycle;
wherein the means for selecting comprises a means for selecting, at the rate of one number per clock cycle, a current number from one of the at least two statistically random number streams based on the state of an oscillator operating at a frequency which varies in response to physically unpredictable events; and
whereby repeated operation of the apparatus creates a cryptographically random number stream at the rate of one number per clock cycle.

* * * * *